Jan. 31, 1967  E. J. SAMPSON  3,300,867
MAGNETIC COMPASS
Filed March 23, 1964  2 Sheets-Sheet 1
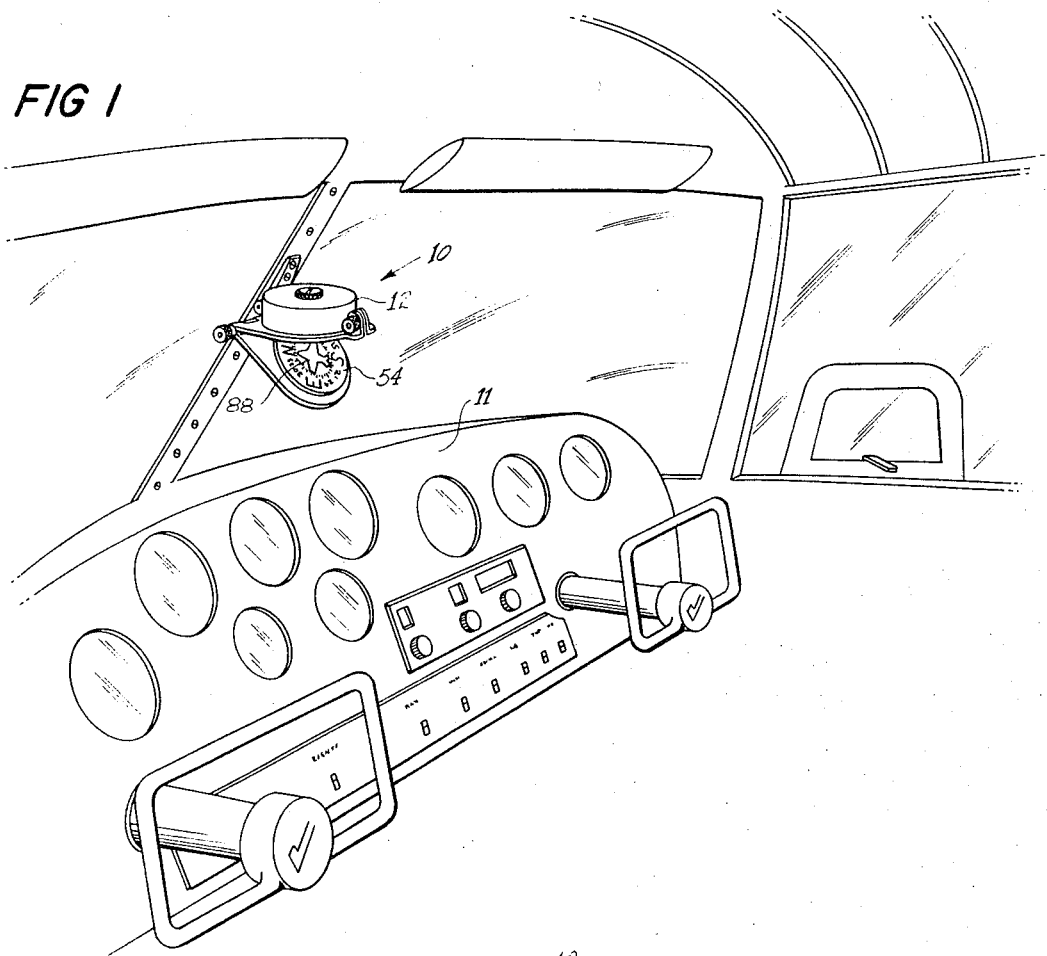
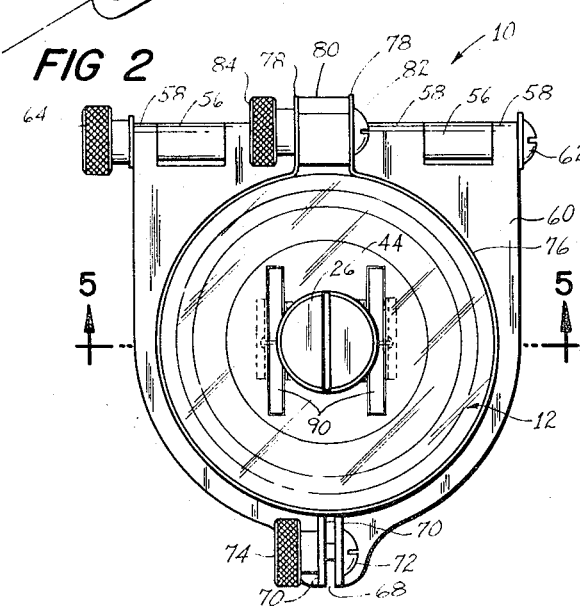
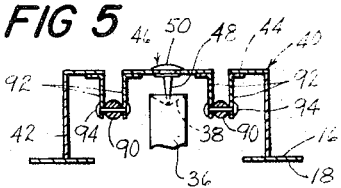
INVENTOR.
EDWARD J. SAMPSON
BY
McCormick, Paulding & Huber
ATTORNEYS Jan. 31, 1967  E. J. SAMPSON  3,300,867
MAGNETIC COMPASS Filed March 23, 1964  2 Sheets-Sheet 2

United States Patent Office 3,300,867
Patented Jan. 31, 1967

3,300,867
MAGNETIC COMPASS
Edward J. Sampson, East Granby, Conn., assignor to Kaman Aircraft Corporation, Bloomfield, Conn., a corporation of Connecticut
Filed Mar. 23, 1964, Ser. No. 353,802
14 Claims. (Cl. 33—222)

This invention relates to magnetic compasses, and deals more particularly with a compass adapted for use with an airplane or other similar vehicle.

The general object of this invention is to provide a relatively simple and inexpensive magnetic compass which is easy to read, wherein the presentation of the compass card is such that the apparent movement of the card is in the same direction as the movement of the aircraft or other vehicle, which is useful as an aid in planning changes in heading, and which overcomes undesirable effects present in other magnetic compasses due to the northerly dip of the magnets.

A more particular object of this invention is to provide a magnetic compass for an airplane or other similar vehicle which may be mounted in, on or adjacent to the instrument panel and which affords the pilot a vertical presentation of the full compass card.

Another object of this invention is to provide a magnetic compass including reference markings fixed relative to the vehicle and cooperable with the markings of the compass card to show both the present heading of the vehicle and various other headings which would result from turns of various angles. In keeping with this object, a more particular object is to provide in association with the compass card a fixed representation of the airplane or other vehicle to which the compass is attached, the vehicle representation being orientated relative to the compass card in a manner matching the orientation of the actual aircraft relative to the earth's magnetic directions so that the magnetic heading or direction of various parts of the aircraft are readily determined by reference to the compass.

A further object of this invention is to provide a means for reflecting the image of a horizontal compass card so that the card as seen by the pilot appears vertical and moves in a direction corresponding to the movement of the aircraft, the pilot further seeing a full 360° of the card to facilitate his perception of the available information.

A still further object of this invention is to provide a magnetic compass in which the magnets are so supported relative to the compass card as to assume the same angle as the magnetic flux about the earth's surface without effecting the level orientation of the card, thereby eliminating the need for a balance weight and the accompanying errors arising from acceleration and deceleration of the balance weight during turns.

Other objects and advantages of the invention will be apparent from the following written description and from the drawings forming a part thereof.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a perspective view showing a magnetic compass embodying the present invention installed in the cockpit of an airplane.

FIG. 2 is a top plan view of the magnetic compass shown in FIG. 1.

FIG. 5 is a fragmentary vertical sectional view taken on the line 5—5 of FIG. 2 and showing the pivotal mounting of the magnets.

Figure 3:
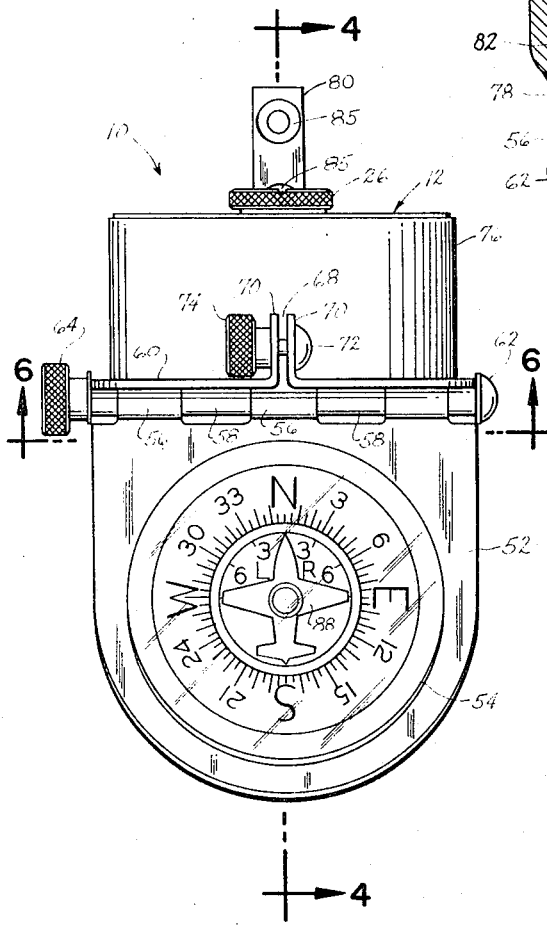
FIG. 3 is a front elevational view of the compass of FIG. 1.

Turning now to the drawings and first considering FIG. 1, this figure shows a magnetic compass 10 embodying the present invention attached to the windshield frame of an airplane above the instrument panel 11, this view showing the compass as seen from behind the pilot's position. The location of the compass as shown in FIG. 1 is exemplary only and the compass could be otherwise located, as for example on or in the instrument panel 11, without departing from the invention, the main consideration being that it be located so as to be easily observable by the pilot. It is also to be understood that the compass 10 is not limited to use with an airplane but may also be used with a variety of other vehicles such as boats, helicopters and automobiles.

Turning to FIGS. 2 to 6, for a description of the construction of the compass 10, it will be noted that it includes a cylindrical housing indicated generally at 12 and having a transparent bottom member 14. Within the housing 12 is a compass card 16 having a downwardly directed face 18 provided with an annular series of reference markings 20, 20 and an associated set of degree and direction indicia as shown best in FIG. 6. The degree and direction indicia as placed on the card surface 18 are of such a character as to constitute mirror image representations of the appropriate numbers and letters.

The housing 12 and the card 16 may take various forms, but in the illustrated case the housing is shown to consist of the transparent bottom member 14, a cylindrical side wall member 22 and a top member 24, all of which are or may be made from clear plastic material and joined together by suitable glue. The top member 24 is provided with a threaded central opening which receives a filler plug 26 for filling the housing with a suitable damping fluid such as kerosene, not shown. The bottom of the filler plug 26 includes a rounded protrusion 28 which aids in maintaining the compass card in place on its pivotal support as hereinafter described. The bottom member 14 of the housing is also provided with a center opening which receives and supports an upwardly extending post 30, the post 30 preferably being made of the same plastic material as the bottom part 14 and being glued to the latter. At its upper end, the post 30 supports a flat circular reference plate or element 32. The reference plate 32 contains a central aperture and passing through this aperture and threaded into a threaded opening in the upper end of the post 30 is the threaded stem 34 of a support member 36 which extends upwardly from the reference plate. From FIG. 4 it will be noted that the upper end of the post 30 and the lower end of the support member 36 include radial shoulders which engage opposite sides of the reference plate 32 to hold the latter in a tightly clamped horizontal position between the post and support members. At its upper end the support member 36 is provided with an upwardly facing and generally conically shaped recess 38 which forms part of a universal pivotal support for the compass card.

For supporting the card member 16 from the support member 36, the card has associated therewith a carriage 40 comprising a vertically extending cylindrical side wall portion 42 and a generally horizontal top portion 44. The cylindrical side wall portion 42 of the carriage has a diameter intermediate the inside and outside diameters of the card 16 and at its lower end is joined to the upper surface of the card as by soldering or other suitable means. The top portion 44 is similarly joined to the side wall portion 42 and at its center is apertured to receive a pivot member 46 which includes a downwardly extending pointed portion 48 received in the conical recess 38 of the suport member 36 and an upwardly extending rounded head portion 50. The rounded head portion 50 is relatively closely spaced to the rounded protrusion 28 on the filler plug 26 so when the filler plug is in place the protrusion 28 is engageable with the head 50 to prevent the pointed portion 48 of the pivot member from moving out of the recess of 38. Under normal conditions the lower end of the pointed portion 48 rests in the point of the conical recess 38 and accordingly provides a universal pivotal support for the compass card 16.

Associated with the housing 12 is a plate member 52 which is inclined relative to the vertical axis of rotation of the card 16 and which carries a mirror 54 located below the transparent bottom 14 of the housing. The mirror is of sufficient size to reflect the entire bottom face 18 of the card 16, as shown best in FIG. 3. The mirror 54 is preferably oval or elliptical in shape so as to appear generally circular when viewed by the pilot and due to the mirror image character of the actual indicia on the card these indicia appear as normal numbers and letters in the image reflected by the mirror 54.

In order to permit attachment of the compass to the vehicle at various spots, the plate 52 is preferably adjustable both about a horizontal axis to adjust the angle of inclination of the mirror 54 and about a vertical axis to change the direction in which the mirror faces. For this purpose the plate 52 in the illustrated case is provided at its upper end with a number of spaced cylindrical hinge portions 56, 56 which are received between a plurality of generally similar cylindrical hinge portions 58, 58 provided on another member 60. The plate member 52 and the member 60 are pivotally and adjustably joined by a bolt 62 which extends through the hinge portions 56, 56 and 58, 58 and which carries on one end a knurled thumb nut 64 which may be loosened or tightened to release or hold the plate member 52 for or against pivotal movement about the axis of the bolt 62 relative to the member 60.

Figure 4:
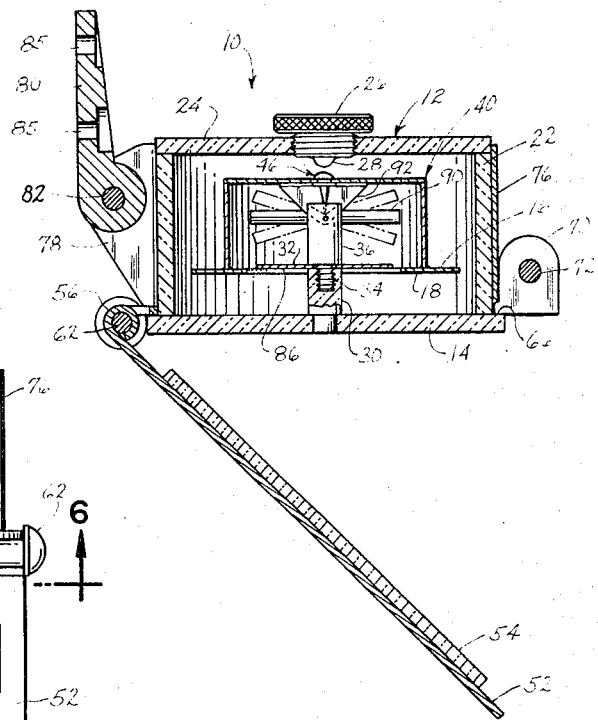
FIG. 4 is a vertical sectional view taken on the line 4—4 of FIG. 3.
Figure 6:
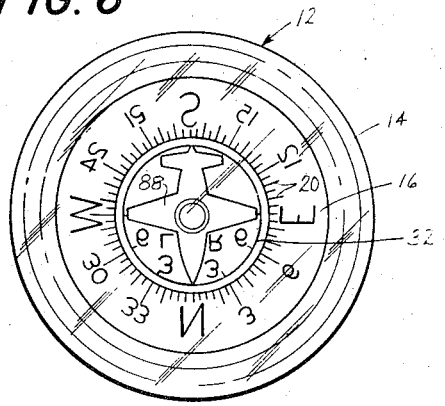
FIG. 6 is a bottom view of the housing of the compass of FIG. 1, the view being taken on the line 6—6 of FIG. 3.

As shown best in FIGS. 2 and 4, the bottom member 14 of the housing extends slightly radially beyond the cylindrical sidewall member of the housing to provide a ledge 66. The member 60 rests on the upper surface of the ledge 66 and extends substantially completely around the cylindrical sidewall member. At its forward end the member 60 is slotted, as shown at 68, and provided with two upstanding ears 70, 70 on either side of the slot. Extending through aligned horizontal apertures in the ears 70, 70 is a bolt 72 having a knurled thumb nut 74 on its free end. Tightening the nut 74 draws the two ears 70, 70 together to cause the member 60 to tightly engage the housing sidewall 22 and prevent movement of the housing 12 relative to the member 60. Loosening the thumb nut 74 loosens the member 60 and permits the housing to be rotated relative the member 60.

The compass housing 12 is adapted for attachment to the vehicle with which it is to be used by means including a band member 76 located above the member 60 and substantially completely surrounding the cylindrical sidewall member 22 of the housing. At the rear end of the housing the band member 76 includes two ears 78, 78, shown best in FIG. 2, which receive therebetween an attachment arm 80, the arm 80 being joined to the ears 78, 78 by a bolt 82 having a knurled thumb nut 84 on one end. When the nut 84 is tightened on the bolt 82, the attachment arm 80 is held in a fixed position relative to the ears 78, 78 and also the housing 12 is held in a fixed position relative to the band 76. When the knob 84 is loosened, the attachment arm 80 may be rotated about the axis of the bolt 82 relative to the housing 12, and similarly the housing 12 may be rotated about a vertical axis relative to the band 86. As shown best in FIG. 4, the attachment arm 80 includes two counterbored openings 85, 85 for receiving screws or other similar means for fastening the arm to the vehicle with which the compass is to be used.

Returning to the compass card 16 and the reference plate 32, the annular series of reference markings 20, 20 on the bottom face of the compass card are located along the inner margin of the compass card adjacent the central opening thereof. The reference plate 32 in turn is circular in shape and positioned generally within the central opening of the compass card and at approximately the same vertical level as the face 18 of the card. The downwardly directed face 86 of the reference plate has at least one marking along its outer margin which is cooperable with the series of markings on the compass card to provide information relating to the magnetic heading of the vehicle. The mark or markings on the reference plate 32 may take various different forms but, preferably and as shown, the reference plate includes in the case of use of the compass with an airplane, a representation 88 of an aircraft having a nose and two wings and a tail with end portions which are located at 90° intervals about the outer margin of the reference plate. In addition to the reference markings provided by such end portions of the representation 88, other degree markings may be provided as shown in FIG. 3. Referring to this figure, it will be noted that between the nose and the right-hand wing of the representation 88 one marking is provided at the 30° point and another marking at the 60° point. Similar 30° and 60° markings are also provided between the nose and the left wing of the representation. Accordingly, if the representation 88 is fixed relative to the airplane and oriented so that its fore and aft axis is parallel with the fore and aft axis of the airplane, and assuming that the compass card 16 is magnetically oriented so that the indicia thereon represent magnetic directions, then by referring to the reference plate and comparing the end portions of the representation 88 and the 30° and 60° markings with the markings on the compass card, the pilot can readily determine his heading, the reciprocal of his heading, and the new headings required to make 30°, 60° or 90° turns either to the right or left. That is, to determine his present heading, the pilot refers to the point on the compass card indicated by the nose of the airplane representation 88. To determine the reciprocal of his heading, he refers to the point on the compass card indicated by the tail of the representation 88. To compute the heading he should achieve after a 30° left turn from his present heading, he refers to the point on the compass card aligned with the 30° left mark on the reference plate. To compute the new headings required for other turns, he refers to the other markings on the reference plate. It will of course be understood that although the illustrated reference plate includes only several degree markings, a greater number of such markings could be provided if desired. Also, if the compass is to be used with a vehicle other than an airplane, an appropriate representation may be substituted for the airplane representation 88.

Another feature of the compass 10 is the support of the magnets whereby the compass card is uninfluenced by the phenomenon of magnetic dip and therefore requires no balance weight that introduces acceleration errors during maneuvers of the aircraft. As shown in FIGS. 4 and 5, two elongated magnets 90, 90 are associated with the card 16. Each of these magnets is supported for pivotal movement about a horizontal axis fixed relative to the compass card and to the magnet and located at approximately the midpoint of the length of the magnet, thereby permitting the magnet to align itself with the earth's magnetic flux without tilting the compass card 16.

FIG. 4 in solid lines shows one magnet 90 oriented in a level position as would be assumed at or near the equator. The broken lines show the magnet in two different tilted positions as would be assumed at locations removed from the equator, the magnet dipping in one direction in the Northern Hemisphere and dipping in the other direction in the Southern Hemisphere.

The means for pivotally supporting the magnets relative to the compass card may take various forms, but in the illustrated case this means includes two pairs of spaced ears 92, 92 extending downwardly from the top part 44 of the card carriage 40. The two ears 92, 92 of each pair are parallel and receive therebetween one associated magnet 90, the magnet having an aperture formed through its midpoint for receiving a pin 94 supported by the ears 92, 92. As shown best in FIG. 5, the two pins 94, 94 are located slightly below the level of the bottom of the conical recess 38 so as to produce a stabilizing influence on the compass card.

Having now described the structure of the compass, its operation may be briefly described as follows: The compass is attached to the airplane or other vehicle with which it is to be used by securing the attachment arm 80 to a fixed part of the vehicle by screws passed through the openings 85, 85. Thereafter, the thumb nut 84 is loosened and the housing 12 of the compass is rotated relative to the band member 76 until the representation 88 of the reference plate 32 is positioned so as to have its fore and aft axes aligned with the fore and aft axes of the actual vehicle. At the same time, the housing is rotated about the axis of the bolt 82 until the housing is so oriented as to be generally level during normal level flight of the airplane. The thumb knob 84 is then tightened to lock the housing in place relative to the attaching arm 80. Thereafter, the thumb nuts 64 and 74 are loosened and the plate 52 and mirror 54 are rotated relative to the housing about a vertical axis and about the horizontal axis of the bolt 62 to bring the mirror to an orientation at which it is readily observable by the pilot. The thumb knobs 64 and 74 are then tightened to lock the plate 52 in the selected position and the compass is then ready for use. In FIG. 1 the plate 52 is shown to be turned about its vertical axis so as to face the pilot rather than to face directly rearwardly of the airplane. It will be noted that when this is done the airplane representation 88 appears to be slightly out of alignment with the fore and aft axes of the airplane. This, however, is only an illusion and does not represent any real error in the reading of the compass since the nose of the aircraft representation 88 as seen by the pilot will always represent the heading of the aircraft.

It should also be noted that the present compass construction increases the ease of reading the compass card particularly in comparison with compasses of the type having vertical reference markings on a cylindrical band. In this latter type compass any tilting of the compass card due to abrupt movement of the vehicle to which it is attached causes movement of the reference markings which movement is transmitted in full to the eyes of the user. However, in the present compass construction similar movement of the compass card produces movement of the reference markings which movement is transmitted to the eyes of the user only in proportion to the cosine of the movement. The apparent movement of the reference markings is therefore much less than the actual movement, and readout of the compass is therefore more accurate and less confusing.

The invention claimed is:

1. In a magnetic compass for use with a vehicle, the combination comprising a housing having a transparent bottom, a compass card supported within said housing for movement about a vertical axis and including a downwardly directed annular face having a central opening and having reference markings arranged in an annular series about said vertical axis, said reference markings being located at the radially inner margin of said card face, a reference element fixed relative to said housing and located within said central opening of said card face, said reference element having at least one reference mark thereon for cooperation with said reference markings of said compass card, and a mirror positioned below said transparent bottom and at an inclined angle to said vertical axis for reflecting an image of said downwardly directed face of said compass card, said mirror being of sufficient size to reflect an image of the complete annular series of said reference markings and of said reference element.

2. The combination defined in claim 1 further characterized by means for attaching said housing in fixed relation to a vehicle, and means connecting said mirror with said housing for adjusting said mirror relative to said housing about said vertical axis.

3. The combination defined in claim 2 further characterized by means for adjusting said mirror about a horizontal axis relative to said housing to vary its angle of inclination.

4. The combination defined in claim 1 further characterized by said compass card being a flat annular disc having a generally circular center opening, means defining a universal pivotal support for said card located above the plane of said downwardly directed face, and a carriage for said card connected with said card and extending between said card and said pivotal support, said reference element having a generally circular downwardly directed face located within said generally circular opening of said card and at approximately the same vertical level as said downwardly directed face of said card.

5. The combination defined in claim 4 further characterized by at least one elongated magnet, and means for pivotally connecting said magnet with said carriage for movement of said magnet about a generally horizontal axis fixed relative to said carriage and said magnet and passing perpendicularly to the magnet through a point located at approximately the midpoint of the length of said magnet so that said magnet is free to pivot about said horizontal axis relative to said card and carriage in accordance with the dip of the earth's magnetic field.

6. The combination defined in claim 4 further charactreized by two elongated magnets arranged generally parallel to one another and located on opposite sides of said vertical axis, and means for pivotally connecting said magnets with said carriage for movement of each magnet about a generally horizontal axis fixed relative to said carriage and said magnet and passing perpendicularly to the magnet through a point located at approximately the midpoint of the length of the magnet so that each magnet is free to pivot about a horizontal axis relative to said card and carriage in accordange with the dip of the earth's magnetic field.

7. The combination defined in claim 6 further characterized by said two horizontal axes about which said magnets pivot being arranged so as to be slightly below the pivot point provided by said universal pivotal support for said card.

8. The combination defined in claim 4 further characterized by said generally circular face of said reference element having a plurality of angularly spaced reference markings cooperable with said annular series of markings on said compass card.

9. The combination defined in claim 1 further characterized by said reference element having a generally circular downwardly directed face coaxial with said vertical axis and having thereon a representation of a vehicle of the type with which the compass is to be used, said representation having a number of parts angularly spaced relative to said circular face and cooperable with said annular series of reference markings of said compass card.

10. In a magnetic compass for use with an airplane, the combination comprising a housing having a transparent bottom, an annular compass card supported within said housing for movement about a vertical axis and including an annular downwardly directed face having a generally circular center opening and an annular series of angularly spaced reference markings located along the radially inner margin thereof adjacent said center opening, a reference element fixed relative to said housing and having a generally circular downwardly directed face coaxial with said vertical axis and located within said center opening of said card face and on approximately the same vertical level as said card face, said reference element face having thereon a representation of an airplane having the end portions of its nose and two wings and tail located at ninety degree angular intervals about the radially outer margin of said reference element face for cooperation with the reference markings on said card face, and a vertically inclined mirror located below said transparent bottom for providing a reflected image of said card and reference element.

11. In a magnetic compass the combination comprising, a housing, a compass card supported for pivotal movement about a generally vertical axis relative to said housing, two elongated magnets arranged generally parallel to one another and located on opposite sides of said vertical axis, means for pivotally supporting each of said magnets relative to said card for movement thereof about a generally horizontal axis fixed relative to said card and said magnet and passing perpendicularly to said magnet through a point located at approximately the midpoint of the length of said magnet so that each of said magnets is free to pivot about a horizontal axis relative to said card in accordance with the dip of the earth's magnetic field, means providing a universal pivotal support for said card relative to said housing and including a pointed pivot member received in a generally conical recess and held in said recess by the weight of said card, and said two horizontal axes about which said magnets pivot being arranged so as to be slightly below the point of contact between said pivot member and said conical recess.

12. In a magnetic compass for use with an airplane, the combination comprising a housing having a transparent bottom, an annular compass card supported within said housing for movement about a vertical axis and including an annular downwardly directed face having a generally circular center opening and an annular series of angularly spaced reference markings located along the radially inner margin thereof adjacent said center opening, a reference element fixed relative to said housing and having a generally circular downwardly directed face coaxial with said vertical axis and located within said center opening of said card face and on approximately the same vertical level as said card face, said reference element face having thereon a representation of an airplane having the end portions of its nose and two wings and tail located at ninety degree angular intervals about the radially outer margin of said reference element face for cooperation with the reference markings on said card face, a vertically inclined mirror located below said transparent bottom for providing a reflected image of said card and reference element, said reference element comprising a generally flat circular disk, a post supported by said transparent bottom of said housing and extending upwardly therefrom, said reference element being supported on the upper end of said post, and another member supported by said post and extending upwardly from said reference element and having an upper end portion forming part of a universal pivot support for said card.

13. The combination defined in claim 6 further characterized by said carriage comprising an inverted cup-shaped member having a generally horizontal top portion and a generally cylindrical side wall portion, said card being fixed to the bottom edge of said side wall portion, and said means for pivotally connecting each of said magnets with said carriage comprising two ears extending downwardly from said top portion of said carriage and straddling the associated magnet and a pin carried by said ears and passing through the associated magnet.

14. In a magnetic compass for use with a vehicle, the combination comprising a housing having a transparent bottom, a compass card supported within said housing for movement along a vertical axis and including a downwardly directed annular face having a central opening and having reference markings arranged in an annular series about said vertical axis, said reference markings being located at the radially inner margin of said card face, a post supported by said transparent bottom of said housing and extending upwardly therefrom through said central opening of said card face, a reference element fixed to said post intermediate its ends and located at approximately the same level as said annular card face, said reference element having at least one reference mark thereon for cooperation with said reference markings of said compass card, said post extending upwardly from said reference element and having an upper end portion forming part of a universal pivot support for said card, and a mirror positioned below said transparent bottom and at an inclined angle to said vertical axis for reflecting an image of said downwardly directed face of said compass card.

References Cited by the Examiner

UNITED STATES PATENTS

| 1,388,292 | 8/1921 | Noisom. | |
| 1,701,034 | 2/1929 | Escallier | 33—222 |
| 1,944,104 | 1/1934 | Niedermann | 33—222 |
| 1,961,312 | 6/1934 | Vion | 33—223 |
| 2,215,622 | 9/1940 | Sperry | 33—222.6 |

FOREIGN PATENTS

| 29,677 | 1910 | Great Britain. |

LEONARD FORMAN, *Primary Examiner.*

SAMUEL S. MATTHEWS, *Examiner.*